April 23, 1929.  G. R. WHITNALL  1,710,129
MATERIAL HANDLING MACHINE
Filed Jan. 3, 1928  3 Sheets-Sheet 1

INVENTOR.
George R. Whitnall.
BY
Morsell, Keeney & Morsell
ATTORNEYS.

April 23, 1929.  G. R. WHITNALL  1,710,129
MATERIAL HANDLING MACHINE
Filed Jan. 3, 1928   3 Sheets-Sheet 2
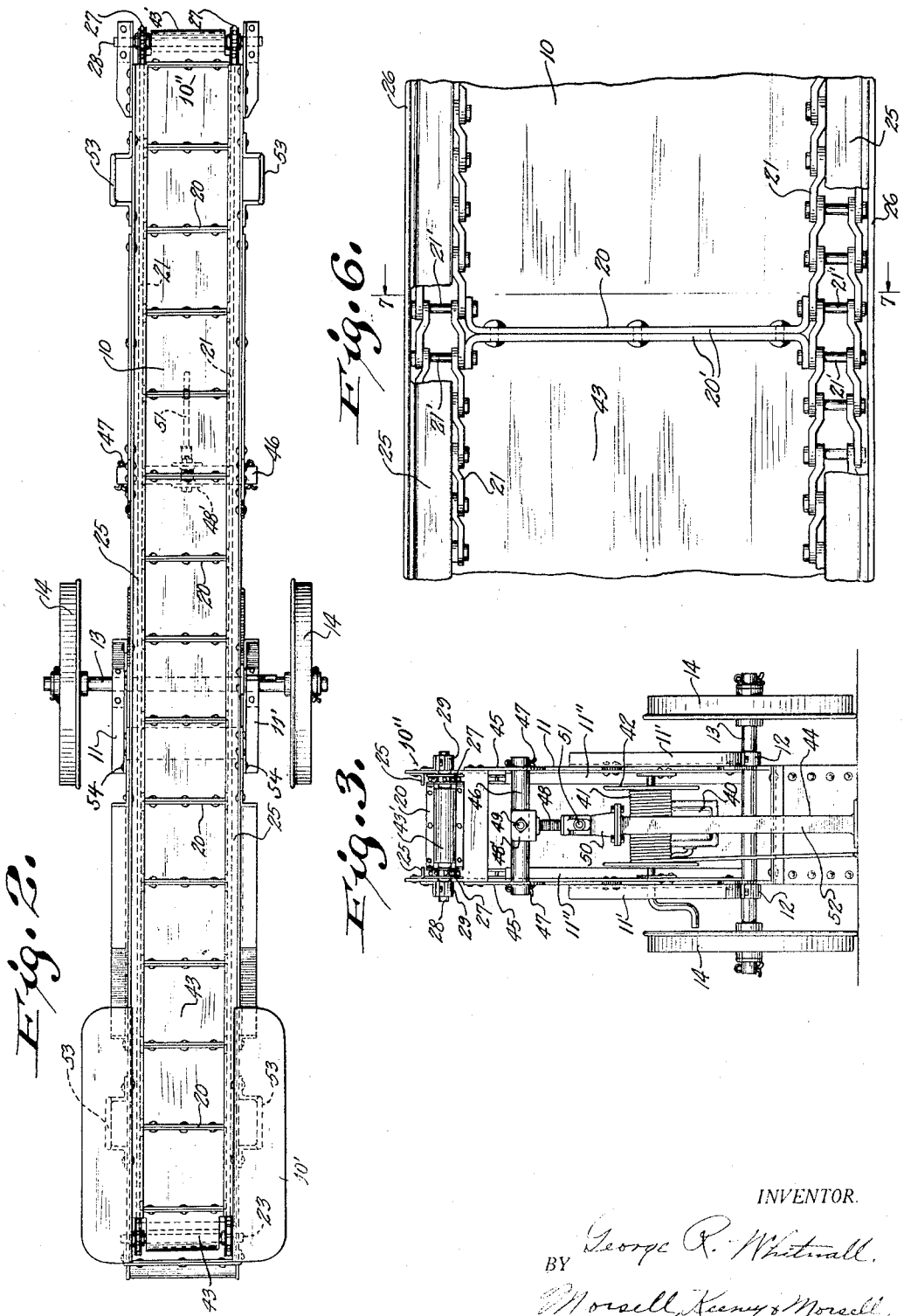

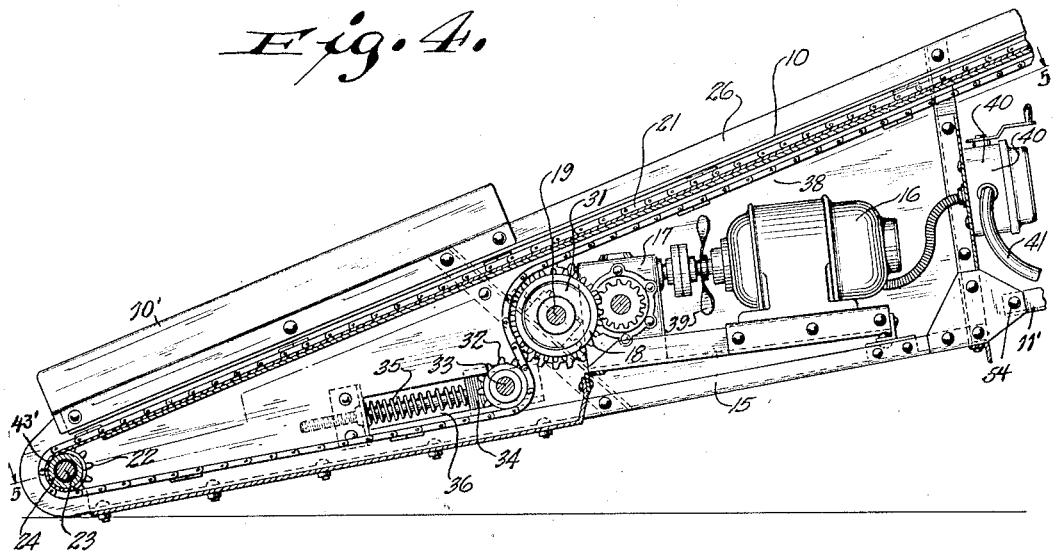

Patented Apr. 23, 1929.

1,710,129

UNITED STATES PATENT OFFICE.

GEORGE E. WHITNALL, OF JANESVILLE, WISCONSIN, ASSIGNOR TO NORTHERN CONVEYOR & MFG. CO., OF JANESVILLE, WISCONSIN, A CORPORATION OF WISCONSIN.

MATERIAL-HANDLING MACHINE.

Application filed January 3, 1928. Serial No. 244,250.

This invention relates to improvements in material handling machines, and more particularly to a mine car loading conveyor.

It is one of the objects of the present invention to provide a mine car loading machine which is adapted to be used within the veins of mines for conveying and loading material onto mine cars, the machine being designed and constructed so that it may be operated with efficiency and moved in cramped and confined quarters.

A further object of the invention is to provide a material handling machine equipped with an integral swivelingly attached jack, forming means whereby the conveyor may be elevated, or used for adjusting the conveyor on a track, or for jacking up and bodily moving the entire conveyor when cramped for operating room, or for assisting in the loading or unloading of the conveyor from a truck.

A further object of the invention is to provide a material handling machine having automatic means for taking up slack in the conveyor chains.

A further object of the invention is to provide a conveyor in which the motor and drive mechanism are located in a compartment under the hopper end portion of the machine whereby the center of gravity of the machine is positioned near the hopper end, permitting the wheels to be mounted at a considerable distance from the discharge end of the machine, resulting in a relatively great amount of clearance for operations.

A further object of the invention is to provide a material handling machine of the class described which is exceptionally light and portable, is safe in its construction and operation and is well suited for work in mines.

A further object of the invention is to provide a material handling machine which is simple, is strong and durable, and is well adapted for the purposes set forth.

A further object of the invention is to provide a material handling machine in which the axis of the motor for driving the endless conveyor belt of the machine extends longitudinally of the machine to permit the use of a worm drive transmission and the formation of a narrow and light weight machine.

A further object of the invention is to provide a material handling machine in which the discharge end portion of the machine from the supporting wheels rearwardly is of greater length than the corresponding length of the receiving end portion and the said parts are approximately balanced when the conveyer portion is in a horizontal position by the position and arrangement of the conveyer motor and transmission.

With the above and other objects in view the invention consists of the improved material handling machine, and its parts and combinations as set forth in the claims, and all equivalents thereof.

In the accompanying drawings in which the same reference characters indicate the same parts in all of the views:

Fig. 2 is a plan view thereof;

Fig. 3 is a view of the discharge end of the machine;

Fig. 4 is an enlarged fragmentary view, partly in section, of the motor and drive enclosing portion of the machine, indicated on line 4—4 of Fig. 5;

Fig. 5 is a sectional view taken on line 5—5 of Fig. 4;

Fig. 6 is an enlarged fragmentary plan view of the conveyor flights and conveyor trough;

Fig. 7 is a cross-sectional view thereof taken on line 7—7 of Fig. 6; and

Figures 1, 8:
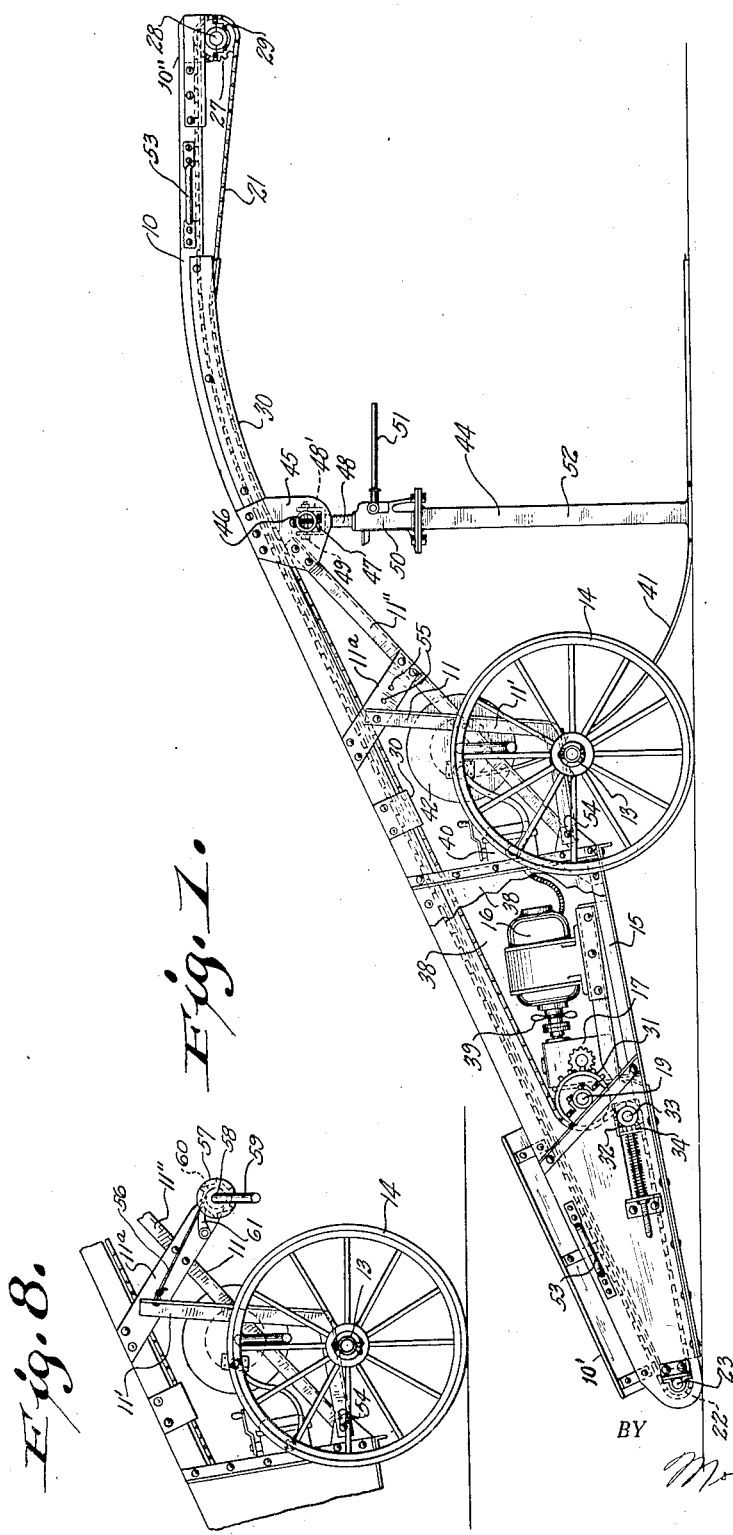
Fig. 1 is a side view of the material handling machine with a part broken away to show the motor and drive.
Fig. 8 is a fragmentary side view illustrating a modification of the means for vertically adjusting the discharge end of the machine.

Referring now more particularly to the drawings, it will appear that the numeral 10 indicates an elongated trough of angular shape and having a lower inner hopper end portion 10′ and an upper outer discharge end portion 10″. Depending from the trough intermediate its ends and slightly closer to the hopper end than to the discharge end, is a frame 11 carrying bearings 12 in which is journaled an axle 13. A pair of large flanged supporting wheels 14 are mounted on the end portions of said axle.

Particular attention is directed to the curved and horizontally extending discharge end portion 10″ of the conveyor trough 10 which permits the said end to extend over the upper edge portion of a mine car to a point adjacent any portion of the car and at the same time clear the edge portion of the car and the low supporting timbers of the ceiling of the mine. In some cases the clearance between the said timbers and the top of the mine car is one foot or less and as the discharge end portion of the machine only occupies a height of six and one-half inches this machine is adapted to extend over the car a considerable distance and to operate in very restricted places.

Depending from the trough adjacent the frame 11 and toward the hopper end, is a motor supporting frame 15, and the position of the frame, together with the weight of the mechanism carried thereby, is sufficient to slightly overbalance the longer discharge end of the machine, as shown in Fig. 1, with the hopper end resting on the ground, whereby the wheels may be positioned as shown, with a relatively great amount of clearance between said wheels and the discharge end of the trough. An electric motor 16 is mounted on the frame 15 and the motor shaft is connected, through a gear reduction 17, with a large gear 18 mounted on the shaft 19 to drive the same.

Spaced-apart, transversely extending flight members 20, later to be explained more in detail, are secured at their end portions to a pair of spaced endless chains 21. The arrangement and path of said chains is as follows: Starting at the lower hopper end of the machine, said chains are extended over a pair of sprocket wheels 22 carried by a shaft 23, which shaft is protected and covered by a cylindrical member 24. The chains extend longitudinally along the side portions of the top surface of the trough 10, between pairs of angle members 25 and 26, forming parts of the trough, as shown clearly in Fig. 7, and at the outer discharge end portion of the trough, said chains are extended over a pair of sprockets 27 carried by a shaft 28 which is mounted in bearings 29. Said bearings are mounted on the lower side of the trough. From the sprockets 27 the chains extend inwardly adjacent the undersurface of the trough and are supported at intervals by channeled straps or members 30. As clearly shown in Figs. 1 and 4, the longitudinal extent of the under-portions of said chains is interrupted adjacent the motor where said chains pass over sprockets 31 carried by the shaft 19, and by which means the chains are driven, and then said chains pass under a pair of sprockets 32 carried by a shaft 33 inwardly of and below the shaft 19 and mounted in bearings 34. From the sprockets 32 the chains continue rearwardly to the first-mentioned sprockets 22.

From Figs. 4 and 5, it will be evident that the bearings 34 are carried by yielding take-up members 35, the bearings being movable longitudinally in guides 36 against the tension of coiled springs 37. In this way, slack in the chains is automatically taken up.

Particular attention is directed to the fact that the axis of the motor 16 extends approximately longitudinally with respect to the length of the machine to permit the use of a comparatively narrow frame and endless conveyer and thereby conduce to the extreme lightness of the entire machine and ease in manually handling same. Furthermore the longitudinally extending motor permits the use of a worm reduction transmission 17 to provide a very high ratio of speed reduction and thereby permit the use of a smaller high speed motor than would ordinarily be used and thus further reduce the weight of the machine.

The motor 16 and the transmission 17 are of such weight and are so positioned with relation to the supporting wheel 14 that they assist in maintaining the charging end of the conveyer resting on the ground and when the conveyer is swung to a horizontal position the motor and the transmission will assist in counterbalancing the longer or discharging end portion of the conveyor to permit easy handling.

The entire motor and drive compartment formed between the bottom member of the frame 15 and the pan 10, is enclosed by side plates 38 which may be formed with peep and hand holes to permit inspection and examination of the motor. The motor shaft carries a fan 39 for cooling the motor and the latter is controlled by a switch 40, with which it is electrically connected. Current is led to the switch through the medium of a cable 41 which is connected with a source of electrical supply, and unextended portions of the cable are wound onto a reel 42.

The top surface of the trough 10 is covered by an elongated sheet of metal 43 forming a wear sheet, which is bent around at both ends, as at 43'. This wear sheet may be easily removed and replaced when required. As previously mentioned, the flights 20 are secured at their end portions to the chains 21. As shown particularly in Figs. 6 and 7, the flights are carried by the chain pins 21', and each flight is formed of a pair of riveted together bars 20' having oppositely flanged end portions to receive the pins 21'.

One of the important features of the invention resides in a jack 44 which depends from the machine intermediate the wheel and the discharge end of the trough and centrally transversely of the trough. A pair of plates 45 depend from the outer portion of the trough and a tubular shaft 46 has its end portions revolubly mounted therein and is held against removal by cotter pins 47. A jack rack 48 has its end portion 48' of bifurcated form to receive the shaft 46 and is revolubly mounted on a bolt 49 extended through the shaft and at right angles thereto. The jack rack is extensile with respect to a jack body 50, from which projects an operating handle 51, and the jack body is secured to an elongated supporting post 52 which is adapted to rest on the ground or on a support. With the mounting of the jack as described, it has a universal joint connection with the machine, and may be pivotally moved longitudinally and laterally of the machine. The machine may be jacked up with its wheels off the ground and the lower inner end resting upon the ground and then swung to the desired position when putting it onto or removing it from tracks, and it may be further moved short distances laterally or longitudinally by being jacked up and swung laterally or longitudinally by utilizing the jack as a pivotal connection between the medial portion of the machine and the ground. This is a desirable feature when short moves only can be made, due to working in a limited space.

For the purpose of moving the entire machine, two sets of handles 53 are provided, arranged as shown in Figs. 1 and 2. Also, in moving the machine onto or off of trucks for transportation, the jack is useful.

As shown in Fig. 1, the axle supporting frame 11 includes a pair of L-shaped arms 11' pivotally connected at their lower ends to elongated, angularly extending frame members 11'' by pivot members. The upper end portions of the arms 11' are adjustably connected to short straps 11ª forming part of the frame, by means of bolts adapted to be extended through any of a series of bolt holes 55 positioned in an arc with relation to the pivot bolts 54. When adjustments of this nature are made, the height or vertical disposition of the discharge end portion of the trough may be varied.

Fig. 8 illustrates a modification in the mechanism for adjusting the vertical disposition of the discharge end of the trough. In this form the L-shaped arms 11' are pivotally connected at their lower ends to the lower ends of the frame members 11''. However, the outer or upper end portions of the arms 11' are not positively directly connected to the straps 11ª, but instead, have the end portions of cables 56 secured thereto. The other end portions of the cables are secured to drums 57, about which the cables are adapted to be wound, and a pair of said drums are mounted fast on a shaft 58 carrying an operating handle 59. Ratchets 60 are secured to the drum, and dogs 61 pivotally secured to the straps 11ª are adapted to engage said ratchets. The result of this arrangement is that by turning the drums to wind or unwind the cables, the arms 11' are adjusted vertically to raise or lower the upper or discharge end of the trough. The dogs and ratchets prevent the drums from undesired unwinding.

The machine is designed for use in the veins of mines for loading material into mine cars and may be used on or off of tracks, and the curved formation of the lower end portion of the trough acts as a skid in sliding the lower end portion to the desired position. When the motor is set into operation, through the drive described, the endless chains are driven and material is loaded onto the hopper end portion of the trough. The flights carry the material upwardly along the trough and discharge it from the upper outer end portion of the trough into mine cars. The machine is light and readily portable and may be worked in cramped quarters, the jack facilitating placing the machine in desired positions.

From the foregoing description it will be seen that the improved material handling machine is of simple and novel construction, and is well adapted for the purposes set forth.

What is claimed as the invention is:

1. A two wheel underground coal mine car loading machine, comprising a tiltable inclined trough member having a lower coal receiving end and an upper curved and horizontally extending discharge end of comparatively shallow depth, a pair of supporting wheels connected to the trough member and positioned considerably closer to the receiving end of the trough than to the discharge end to provide a trough discharge end portion which is of greater length than the charging end portion and which is free from obstruction below the plane of and between said discharge end and a vertical plane adjacent the wheels, an endless conveyor for moving coal along said trough member, an electric motor carried beneath the trough between the supporting wheels and the charging end of the trough and having its shaft extending longitudinally with respect to the trough member, and a driving connection between the motor shaft and the endless conveyer.

2. A two wheel underground coal mine car loading machine, comprising a tiltable inclined frame member having an upper trough like portion and a lower supporting portion, said frame member having a lower receiving end and an upper curved and horizontally extending discharge portion, a pair of supporting wheels connected to the supporting portion of the frame and positioned to provide a trough discharge end portion which is of greater length and less depth than the charging end portion and which is free from obstructions below the plane of and between said discharge end and a vertical plane adjacent the wheels, an endless conveyor for moving coal along said trough member, an electric motor mounted on the supporting portion of the frame between the wheels and the charging end of the trough and having its shaft extending longitudinally with respect to the trough member, and a gear reduction interposed between the motor and the endless conveyor for driving said conveyer.

3. A two wheel underground coal mine car loading machine, comprising a tiltable inclined frame member having an upper trough like portion and a lower supporting portion, said frame member having a lower receiving end and an upper horizontally extending discharge portion, a pair of supporting wheels connected to the supporting portion of the frame and positioned to provide a trough discharge end portion which is of greater length and less depth than the charging end portion and which is free from obstructions below the plane of and between said discharge end and a vertical plane adjacent the wheels, an endless conveyer for moving coal upwardly on said trough member, an electric motor mounted on the supporting portion of the frame between the wheels and the charging end of the trough and having its shaft extending longitudinally with respect to the trough member, and a gear reduction means interposed between the motor and the endless conveyer for driving said conveyer, said motor and reduction means maintaining the trough normally in an inclined position but serving to counterbalance the discharge end of the trough when said trough is in a horizontal position.

4. A two wheel underground coal mine car loading machine, comprising a tiltable inclined trough member having a lower coal receiving end and an upper horizontally extending discharging end of comparatively shallow depth, a pair of supporting wheels connected to the trough member medially of its length, an endless conveyer for moving coal along said trough member, an electric motor carried by the trough member and having its shaft extending longitudinally with respect to the trough member, a driving connection between the motor shaft and the endless conveyer and a jack depending from and having a universal joint connection with the discharge end portion of the trough and engageable with the ground for raising the wheels from the ground and moving the machine in any direction.

5. A two wheel underground coal mine car loading machine, comprising a tiltable inclined trough member having a lower coal receiving end and an upper discharge end, a pair of supporting wheels connected to the trough member medially of its length, an endless conveyer for moving coal along said trough member, means for operating the endless conveyer, and a jack pivotally depending from the trough and engageable at its lower end with the ground for raising the wheels from the ground and tilting and moving the machine in any direction.

In testimony whereof, I affix my signature.

GEORGE R. WHITNALL.